(12) United States Patent
Petersen et al.

(10) Patent No.: US 10,884,681 B2
(45) Date of Patent: Jan. 5, 2021

(54) PROHIBITED PREVIEWS

(71) Applicant: HEWLETT-PACKARD DEVELOPMENT COMPANY, L.P., Spring, TX (US)

(72) Inventors: Cecilee Petersen, San Diego, CA (US); Emily Gran, San Diego, CA (US); Rhea Adhikary, San Diego, CA (US); Bailey Herbstreit, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/604,137

(22) PCT Filed: Dec. 18, 2017

(86) PCT No.: PCT/US2017/066956
§ 371 (c)(1),
(2) Date: Oct. 9, 2019

(87) PCT Pub. No.: WO2019/125356
PCT Pub. Date: Jun. 27, 2019

(65) Prior Publication Data
US 2020/0319828 A1      Oct. 8, 2020

(51) Int. Cl.
*G06F 3/12* (2006.01)
*H04N 1/44* (2006.01)
(Continued)

(52) U.S. Cl.
CPC .......... *G06F 3/1222* (2013.01); *G06F 3/1219* (2013.01); *G06F 3/1238* (2013.01);
(Continued)

(58) Field of Classification Search
CPC .... G06F 3/1222; G06F 3/1219; G06F 3/1238; G06F 3/1239; G06F 3/1285;
(Continued)

(56) References Cited

U.S. PATENT DOCUMENTS

| | | | |
|---|---|---|---|
| 6,307,640 B1 * | 10/2001 | Motegi ................ | G06F 21/608 358/1.14 |
| 6,337,712 B1 * | 1/2002 | Shiota .................... | G07F 17/26 348/231.1 |
| 7,586,635 B2 * | 9/2009 | Maeda ............... | H04N 1/00204 358/1.1 |
| 7,620,177 B2 | 11/2009 | Ibrahim et al. | |

(Continued)

OTHER PUBLICATIONS

Making Objects Visible, Invisible, or Hidden, Adobe, Home/ADEP Document Services—Designer 10.0 Help/Working with Objects.

*Primary Examiner* — Chad Dickerson
(74) *Attorney, Agent, or Firm* — Brooks Cameron & Huebsch PLLP

(57) ABSTRACT

Example implementations relate to prohibited previews. The system may include a computing device including instructions executable to send a first image to a printing device, wherein the printing device is prohibited to display a preview of the first image and wherein the computing device is not authorized to print the first image utilizing the printing device. The instructions may be executable to send a second image to the printing device, wherein the second image includes a graphical identifier of a sender. The system may include a printing device including instructions executable to display the second image, receive an authorization to print the non-displayable first image, and print the first image.

15 Claims, 3 Drawing Sheets

(51) Int. Cl.
  *G06K 15/00* (2006.01)
  *G06F 21/60* (2013.01)
(52) U.S. Cl.
  CPC .......... *G06F 3/1239* (2013.01); *G06F 3/1285* (2013.01); *G06F 21/608* (2013.01); *G06K 15/4095* (2013.01); *H04N 1/4406* (2013.01); *H04N 1/4433* (2013.01)
(58) Field of Classification Search
  CPC .... G06F 21/608; G06F 21/62; G06F 21/6209; H04N 1/44; H04N 1/4406; H04N 1/4413; H04N 1/442; H04N 1/4446; H04N 1/4453; H04N 1/448; H04N 1/4486; H04N 1/4493; G06K 9/00006; G06K 9/00221; G06K 9/00248; G06K 9/00268; G06K 9/00302; G06K 9/00335; G06K 15/4095
  USPC ........ 358/1.11–1.18, 400–404, 1.1; 713/182, 713/186; 726/2, 3, 4, 16, 17, 21, 26, 27, 726/28, 29, 31
  See application file for complete search history.

(56) References Cited

U.S. PATENT DOCUMENTS

| | | | |
|---|---|---|---|
| 7,889,369 B2 * | 2/2011 | Yoshida | H04N 1/324 358/1.15 |
| 9,237,426 B2 | 1/2016 | Weiss | |
| 2001/0019425 A1 | 9/2001 | Yamashita | |
| 2001/0046067 A1 * | 11/2001 | Taniguchi | H04L 67/16 358/1.15 |
| 2003/0112464 A1 | 6/2003 | Garcia et al. | |
| 2006/0066891 A1 * | 3/2006 | Ikeda | G06F 3/1222 358/1.15 |
| 2008/0010079 A1 * | 1/2008 | Genda | H04N 1/442 358/1.15 |
| 2008/0320296 A1 | 12/2008 | Walker et al. | |
| 2009/0091775 A1 * | 4/2009 | Yoshida | H04N 1/00233 358/1.13 |
| 2009/0148006 A1 * | 6/2009 | Hayasaki | H04N 1/32767 382/118 |
| 2010/0017854 A1 * | 1/2010 | Takeishi | G06F 21/31 726/3 |
| 2013/0335784 A1 | 12/2013 | Kurtz et al. | |
| 2015/0205552 A1 | 7/2015 | Sasase | |
| 2016/0112584 A1 | 4/2016 | Park et al. | |

\* cited by examiner

PROHIBITED PREVIEWS

BACKGROUND

Printing devices may include hardware and instructions executable by a processor to generate a representation of graphics or text on a print media. The printing device may utilize inputs as instructions for generating the representation of graphic or text. For example, the printing device may receive, from an external computing device, an input specifying a graphic or text to be generated by the printing device. In some examples, printing devices may include a display.

DETAILED DESCRIPTION

Figure 1:
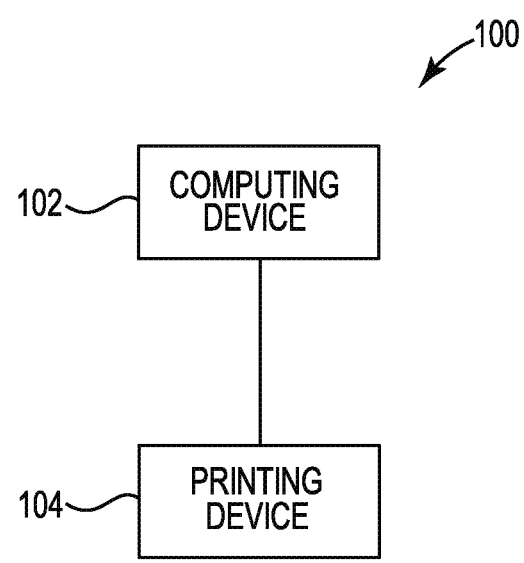
FIG. 1 illustrates a diagram of an example of a system for prohibited preview printing according to the present disclosure.

Printing devices may be utilized to generate a physical print of electronic data. The physical print may be a human user-readable image defined by the electronic data. For example, a printing device may generate an image, such as a photograph defined by electronic data sent from a separate computing device, on print media.

Generating an image with a printing device may be associated with a cost. For example, generating an image may consume printing resources such as electricity, print media, printing fluid (e.g., ink), printing solids (e.g., toner powder), 3-dimensional printing materials, time, etc., all which may be associated with a cost. As such, printing images may be associated with extensive previewing and pre-print processing prior to generating the image with the printing device in order to conserve printing resources that may be otherwise consumed generating images that a printing user does not want and/or that a printing user determines should be modified and reprinted.

Additional measures may be utilized with printing devices to conserve printing resources. For example, a printing device and/or a network manager may utilize permissions to restrict the ability to cause the printing device to print an image to those computing devices with appropriate printing permissions.

Printing devices and/or the generation of an image by a printing device may be largely utilitarian centered and unintegrated with social interactions between human users. Alternatively, social media may include computing device-mediated technologies that facilitate the creation and sharing of information, content, ideas, interests and other forms of expression via virtual communicates and/or networks. For example, various social networking services may include Internet-based applications that may be utilized by users to provide interaction and/or multimedia messaging between members of the network. A user of a social networking service may be associated with a profile and may form connections and/or groups with other profiles and/or users. In some examples, a user may form a group of contacts and/or friends that are also members of the social networking service with whom the user may communicate. Some examples of social network services may include Facebook®, WhatsApp®, Instagram®, Tumblr®, Twitter®, Snapchat®, Pinterest®, LinkedIn®, etc.

A social networking service may be utilized to connect and facilitate communication between human users. The social network service may facilitate the communication across various computer networks to various computing devices associated with the human users, Printing devices may be connected to computing networks. However, printing devices may not have a role in the social network service facilitated communication between human users. For example, printing permissions for a printing device may not be related to and/or influenced by a social networking service. While an item of social media content may be printed via the printing device, the command to print the content and/or the instructions of the content to be printed may be generated by a user's computing device associated with the printing device and having the appropriate permissions to issue the command rather than the particular sender of the content. The user of the computing device associated with the printing device may select, modify, and/or preview the content prior to deciding whether to issue the print command to the printing device.

In contrast, examples described herein may include a system including a computing device and a printing device. The computing device may include instructions executable by a processor to send a first image to a printing device, wherein the printing device is prohibited to display a preview of the first image and wherein the computing device is not authorized to print the first image utilizing the printing device. The computing device may include instructions executable to send a second image to the printing device, wherein the second image includes a graphical identifier of a sender. The printing device may include instructions executable to display the second image, receive an authorization to print the non-displayable first image, and print the first image.

FIG. 1 illustrates a diagram of an example of a system 100 for prohibited preview printing according to the present disclosure. The system 100 may include a computing device 102. The computing device 102 may include a processor to execute computer-readable instructions. The computing device 102 may include a computer-readable storage medium storing the computer-readable instructions executable by the processor. The computing device 102 may include a display for displaying images including a graphical user interface (GUI) of the computing device 102 to a user.

The computing device 102 may be connected to a computer network. For example, the computing device 102 may have a wired and/or wireless connection to a local area network (LAN), wireless local area network (WLAN), and/or a cellular network. The computing device 102 may be connected to the Internet. The computing device 102 may include a desktop computer, a laptop computer, a tablet computer, a smartphone, a smart device, etc. The computing device 102 may utilize the computer network to transmit data to another computing device, another user, and/or a printing device 104. The another computing device, another user, and another printing device 104 may be distinct and/or physically remote from the computing device 102 and may be connected to a common computing network, such as the Internet, through another computing network (e.g., LAN, WLAN, Cellular, etc.) that is distinct and physically remote from a computing network (e.g., LAN, WLAN, Cellular, etc.) that the computing device 102 is connected to.

The computing device 102 may be associated with a sender. The sender may be a sender of content. The sender may be a sender of social media content utilizing a social network. The content may include content generated and/or modified by the sender. The content may include images such as photographs captured by the computing device 102 and/or other images generated or modified by the computing device 102.

The sender may be a human user of the computing device 102. The sender may include and/or be associated with a social network profile. The sender may be associated with a group of contacts. The group of contacts may include other human users and/or corresponding profiles that the sender shares a connection with within the social network service. The group of contacts may be formed through a series of requests and/or replies between the sender and other users to form the connection utilizing the social network service.

The system 100 may include a printing device 104. The printing device 104 may include a mobile printer. For example, the printing device 104 may have a relatively small and light weight form factor and may be configured to be transported, for example in a purse or pocket, from one location to another without reconfiguration. The printing device 104 may communicate with a computer network and/or other computing device via a wireless data connection such as W-Fi or Bluetooth. The printing device 104 may utilize an on-board battery to operate. The on-board battery may be rechargeable.

The printing device 104 may be a special purpose printing device. For example, the sprinting device 104 may generate images on specialized print media that utilizes material, coatings, and pre-processes that alter the manner in which the print media responds to a printing process and/or an appearance of a printed image after the image is generated on the print media. For example, the printing device 104 may be a photo printer and/or print on photo paper. In an example, the printing device may generate images on photo paper that is two inches by three inches and has a pressure sensitive adhesive backing. The printing device 104 may not dispense a printing liquid such as ink or a printing powder such as toner onto the print media. The printing device 104 may generate images on the print media by exposing the print media to heat pulses of various lengths and intensities to generate corresponding colors forming the image on the print media as it passes through the body of the printing device 104.

The printing device 104 may include a display. The display may be a color display. The display may generate images viewable by a human user. The display may generate images of content received by the printing device 104. The display may be touch sensitive and may generate a selectable menu of options on a viewable surface of the display.

The printing device 104 may be associated with a receiver. The receiver may be a receiver of content from a sender. The receiver may be a receiver of social media content utilizing a social network. The content may include content generated and/or modified by a sender. The content may include images such as photographs captured by the computing device 102 and/or other images generated or modified by the computing device 102.

The receiver may be a human user associated with the printing device 104, The receiver may be an owner or an agent of an owner of the printing device 104. The receiver may have a permission to print using the printing device 104. The permission may be an unrestricted permission. The receiver may be able to set permissions for other users to print using the printing device 104.

The receiver and/or the printing device 104 may include and/or be associated with a social network profile. The receiver and/or printing device 104 may be associated with a group of contacts. The group of contacts may include other human users and/or corresponding profiles that the receiver shares a connection with within the social network service. The group of contacts may be formed through a series of requests and/or replies between the receiver and other users to form the connection utilizing the social network service.

The printing device 104 may be connected to a computer network. For example, the printing device 104 may have a wired and/or wireless connection to a local area network (LAN), wireless local area network (WLAN), and/or a cellular network. The printing device 104 may utilize the computer network to transmit data to and/or receive data from the computing device 102. The printing device 104 may be connected to a computer network that is separate from the computer network that the computing device 102 is connected to. The printing device 104 may be connected to the Internet and may communicate with the computing device 102 utilizing the Internet to transport data between the two distinct and/or physically remote networks of the printing device 104 and the computing device 102.

The sender of the content associated with the computing device 102 and the receiver of the content associated with the printing device 104 may be separate human users and/or be associated with separate profiles. As such, the computing device 102 may not possess a permission to utilize the printing device 104 to print an image. In some examples, the computing device 102 may utilize the printing device 104 to print an image subject to an authorization or confirmation received at the printing device. The authorization may be received at the printing device from the receiver and/or from a computing device associated with the receiver that is separate from the computing device 102.

For example, the printing device 104 may be a personal printing device belonging to a receiver. The receiver may have the printing device 104 in the receiver's home connected to their home computing network. The computing device 102 may be a smartphone belonging to a sender. The computing device 102 may be a smartphone belonging to the sender. The sender may have the computing device 102 in a public park connected to a cellular network. The sender may be a social media contact of the receiver. The sender and/or computing device 102 may not have a permission to utilize the printing device to print an image without the authorization of the receiver.

The sender may utilize the computing device 102 to send a request to a computing device of a receiver for authorization to send images from the computing device 102 to the printing device 104. Alternatively, the sender and/or the computing device 102 may receive the authorization to send images to the printing device 104 as a condition of becoming a contact or establishing a connection with the receivers profile through a social networking service. The computing device 102 may, according to such an authorization, send images to be printed to the printing device 104. In some examples, the computing device 102 may send the images to be printed to a computing device associated with the receiver that is separate from computing device 102. However the sender and/or the computing device 102 may not cause the printing device 104 to print the images. The printing of the images by the printing device 104 may be subject to an authorization issued by the sender to print the images. Each image sent from the computing device 102 to the printing device 104 may be subject to an additional authorization to print issued by the sender. The authorization to print may be received via a selection of a selectable option on a touch sensitive portion of the display of the printing device 104, via a actuation of a physical or virtual button on the printing device 104, and or received at the printing device 104 from a computing device associated with the receiver that is separate from the computing device 102.

The computing device 102 may include instructions executable by a processor to send a first image to the printing device 104. The computing device 102 may not be authorized to utilize the printing device 104 to print the first image. The ability of the computing device 102 to utilize the printing device 104 to print the first image may be subject to an authorization received at the printing device 104.

The computing device 102 may capture, produce, modify, and or select the first image to be sent to the printing device 104. For example, the computing device 102 may be utilized to take a digital photograph to be used as the first image. The sender associated with the computing device 102 may preview the first image prior to sending the image to the printing device 104.

The computing device 102 may receive a designation of at least one printing device 104 to send the first image to from the sender. The printing device 104 may be selected by a sender's selection of a receiver corresponding to the printing device 104. Selecting the receiver may include selecting the receiver from a list of potential receivers populated from a social networking service contact list. The receiver may authorize the computing device 102 to transmit the first image responsive to a request received at the printing device 104 and/or at a computing device of the receiver.

The computing device 102 may receive a designation from the sender that the first image is prohibited from being previewed by the receiver. As such, the printing device 104 may be prohibited from displaying a preview of the first image. As used herein, a preview of the first image may include a graphical representation of the first image displayed on a display of the printing device 104. A preview may be a graphical representation of the first image display on a computing device associated with the receiver. A preview may include a graphical representation of the first image or a portion of the first image to be printed that is visible by a receiver prior to authorizing the printing device 104 to print the first image and/or prior to the printing of the first image by the printing device 104. The sender may have no indication of the appearance and/or contents of the first image prior to the printing device 104 generating the image on print media. The appearance of the first image may remain a mystery to the receiver until it is viewed printed on the print media.

The computing device 102 may include instructions executable by a processor to send a second image to the printing device 104. The second image may accompany the first image. The second image may include a graphical representation of the sender. For example, the second image may include a customized cartoon avatar likeness of the receiver. The second image may include a graphical identifier of a mood of the receiver. The second may include an emoji graphically identifying a mood or sentiment of the receiver. The second image may include a personalized emoji that graphically identifies a mood or sentiment of the receiver through a personalized expressive emoji that resembles the appearance of the sender. The second image may include text. The text may be customized and may communicate a message about the sender, a sentiment of the user, or a message intended to accompany the first image. The second image may include a geographic location of the sender and/or a location featured in the first image.

The printing device 104 may include instructions executable to display the second image. For example, the printing device 104 may display the second image on a display of the printing device 104. As such, a receiver may view the second image on the printing device 104, Along with displaying the second image, the printing device 104 may display a prompt to the receiver to authorize or reject the printing of the first image by the printing device 104. For example, the prompt may appear on a touch sensitive portion of the display of the printing device 104. The prompt may state the name of the sender. The prompt may include a selectable option to authorize the printing device 104 to print the first image and/or a selectable option to prohibit the printing device 104 to print the first image.

As described above, the receiver may not preview the first image or have any knowledge of its contents. The receiver may, therefore, make a judgement as to whether to print the first image on the printing device 104 based on the second image and/or the prompt, but not based on a preview of the first image. In this manner, the printing of images may be gamified and encouraged. In order to reveal the first image, the receiver may have to print the first image since a digital preview or indication of the contents of the first image is not allowed.

The printing device 104 may receive an authorization to print the non-displayable first image. The printing device 104 may receive the authorization from the receiver via an actuation of a button and/or a selection of an option on a touch sensitive portion of a display of the printing device 104. Alternatively, the printing device 104 may receive the authorization from a computing device associated with the receiver.

The authorization may be received prior to printing the first image. The authorization may be received after the second image is displayed. The authorization may be received with displaying a preview of the first image. The authorization may be received without the receiver knowing the contents and/or appearance of the first image.

The printing device 104 may, responsive to receiving the authorization, print the first image. The receiver may view the first image for the first time when it is printed on the print media and ejected from the printing device 104. The printing device 104 may display the second image while the first image is being printed. The printing device 104 may transmit a confirmation to the computing device 102 that the first image was authorized to be printed and/or was printed at the printing device 104.

In some examples, the computing device 102 may include instructions executable by a processor to limit an amount of images the computing device 102 is permitted to send to the printing device 104. The limit may be a limit on the amount of images that the computing device 102 is permitted to send to the printing device 104 that the printing device 104 is prohibited to display. Designating at the computing device 102 that an image be sent to the printing device 104 to be printed without being permitted to be displayed at the printing device 104 may be disabled once the amount of such images sent from the computing device 102 to the printing device 104 reaches the limit. The limit may be a limit on the amount of images that the computing device 102 is permitted to send over a period of time (e.g., twenty-four hours, a day, a week, a month etc.) to the printing device 104 that the printing device 104 is prohibited to display. The limit amount may be determined by the receiver and may utilize a credit system whereby the printing device 104 issues credits to the computing device 102 in the amount of the limit. In such an example, the computing device 102 may exchange a credit from the amount each time it sends an image to the printing device 104 that the printing device 104 is prohibited to display.

In some examples, the printing device 104 may include instructions executable by a processor to limit an amount of images the printing device 104 is permitted to receive. The limit may be a limit to an amount of images that the printing device 104 is permitted to receive that it is prohibited to display. The limit may be a limit to an amount of those images received over a period of time (e.g., twenty-four hours, a day, a week, a month etc.). The limit may be a limit to an amount of those images from a single computing device 102, a single sender, a plurality of computing devices, and/or a plurality of senders. An image that is prohibited from being displayed by the printing device 104 that is in excess of the limit may be rejected from being received at the printing device 104. Additionally, the printing device 104 may include a queue. The queue may store the first and second images sent to the printing device 104 until they are authorized to be printed or prohibited from being printed. In some examples, when an image is received that is prohibited from being displayed by the printing device 104, the image may be stored in the queue until a period of time associated with the limit expires.

Figure 2:
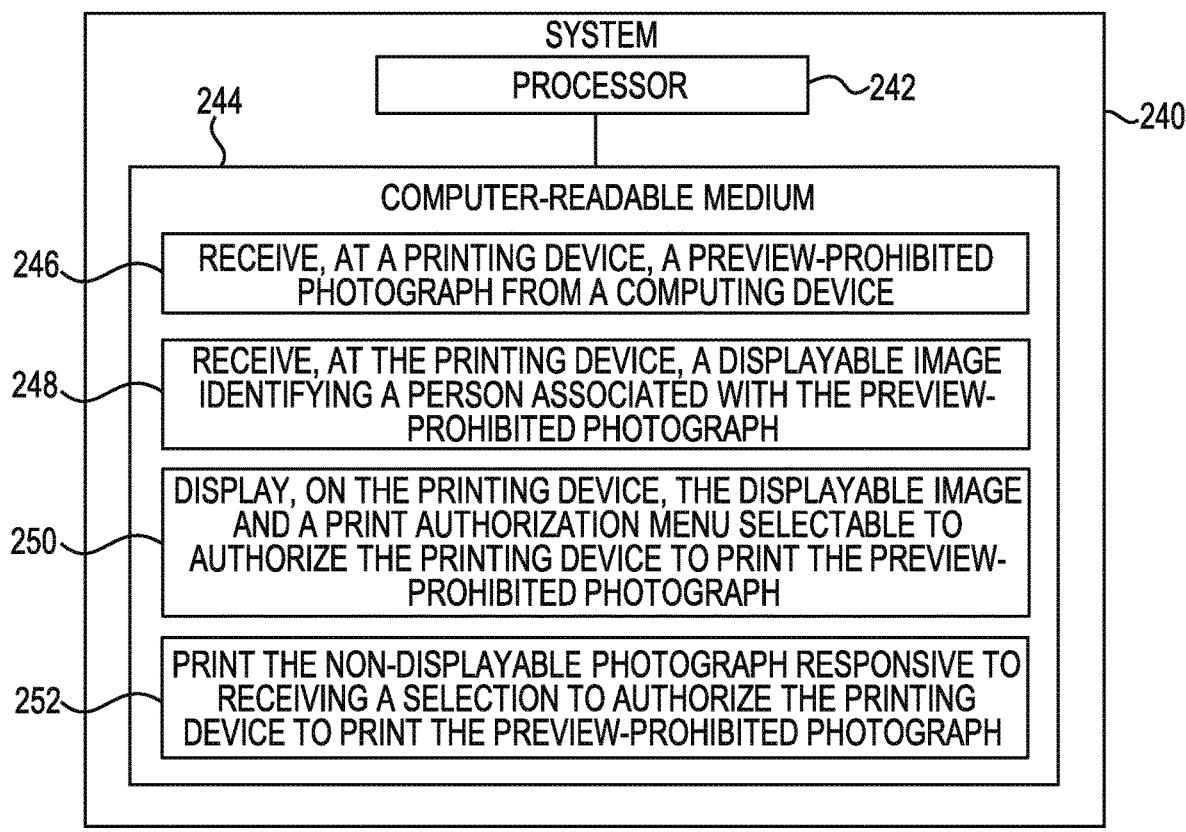
FIG. 2 is a block diagram of an example system for prohibited preview printing according to the present disclosure.

FIG. 2 is a block diagram of an example system 240 for prohibited preview printing according to the present disclosure. System 240 may be the same as or different than, the system 100 illustrated in FIG. 1. System 240 may include at least one computing device that is capable of communicating with at least one remote system. In the example of FIG. 2, system 240 includes a processor 242 and a computer-readable medium 244. Although the following descriptions refer to a single processor and a single computer-readable medium, the descriptions may also apply to a system with multiple processors and computer-readable mediums. In such examples, the instructions may be distributed (e.g., stored) across multiple computer-readable mediums and the instructions may be distributed (e.g., executed by) across multiple processors.

Processor 242 may be a single or a plurality of central processing units (CPUs), microprocessors, and/or other hardware devices suitable for retrieval and execution of instructions stored in computer-readable medium 244. In the particular example shown in FIG. 2, processor 242 may receive, determine, and send instructions 246, 248, 250, and 252 for connection identification. As an alternative or in addition to retrieving and executing instructions, processor 242 may include a single or a plurality of electronic circuits comprising a number of electronic components for performing the functionality of a single or a plurality of the instructions in computer-readable medium 244. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Computer-readable medium 244 may be any electronic, magnetic, optical, or other physical storage device that stores executable instructions. Thus, computer-readable medium 244 may be, for example, Random Access Memory (RAM), an Electrically-Erasable Programmable Read-Only Memory (EEPROM), a storage drive, an optical disc, and the like. Computer-readable medium 244 may be disposed within system 240, as shown in FIG. 2. In this situation, the executable instructions may be "installed" on the system 240. Additionally and/or alternatively, computer-readable medium 244 may be a portable, external or remote storage medium, for example, that allows system 240 to download the instructions from the portable/external/remote storage medium. In this situation, the executable instructions may be part of an "installation package". As described herein, machine-readable medium 244 may be encoded with executable instructions for prohibited preview printing according to the present disclosure.

Referring to FIG. 2, instructions 246, when executed by a processor (e.g., 242), may cause system 240 to receive, at a printing device, a preview-prohibited photograph from a computing device. The preview-prohibited photograph may be captured from a camera of the computing device. The preview-prohibited photograph may be an image that is prohibited from being previewed on the printing device and/or a device associated with the printing device. The preview-prohibited photograph may be an image that is unable to be viewed by a receiver of the image prior to printing the image at the printing device. As described above, the photograph may be sent from a first computing device. The first computing device may be associated with a first person. For example, the first person may be logged in to their personal profile on the first computing device.

The photograph may be sent to the printing device. The printing device may be associated with a second person. For example, the printing device may be associated with a personal profile of the second person. The first and second people may be different people. The first and second people may not share permissions with respect to either the computing device or the printing device. For example, the second person may not have permissions to utilize the computing device and the first person may not have permissions to utilize the printing device. In contrast to a computing device that is connected to a printing device and has permissions to utilize the printer to print the photograph, the computing device and/or the person using the computing device to send the photograph does not have the permissions to utilize the printer to print the photograph and relies on an authorization from a different person received at the printing device.

As described above, the computing device and the printing device may reside on different computer networks. The computing device and the printing device may communicate data between one another utilizing an Internet connection between the two different computer networks. The printing device may communicate data wirelessly. For example, the printing device may utilize a wireless connection to a WLAN to receive the preview-prohibited photograph.

Referring to FIG. 2, instructions 248, when executed by a processor (e.g., 242), may cause system 240 to receive, at the printing device, a displayable image. The printing device may utilize a wireless connection to a WLAN to receive the displayable image as well. The displayable image may include an image that may be displayed on a display portion of the printing device. The displayable image may include an image that may be displayed to a receiver prior to the printing device generating a print of the preview-prohibited photograph. The displayable image may include an image that may be displayed along with a prompt on the display portion of the printing device. The prompt may include a prompt to a receiver to authorize or reject the printing of the preview-prohibited photograph on the printing device.

The displayable image may not include content from the photograph. Instead, the displayable image may include an image that identifies a person associated with the preview-prohibited photograph. For example, the displayable image may include a cartoon likeness of the person that is featured in the preview-prohibited photograph, captured the preview-prohibited photograph, and or is the owner of the profile from which the preview-prohibited photograph is being sent on the computing device. The displayable image may be selected by a sender of the preview-prohibited photograph from a group of customized cartoon avatars resembling the sender and expressing a range of gestures and/or emotional states of the sender.

Referring to FIG. 2, instructions 250, when executed by a processor (e.g., 242), may cause system 240 to display, on the printing device, the displayable image on a display portion of the printing device. The printing device may also display a print authorization menu on the display portion of the printing device. The print authorization menu may be a selectable menu to authorize the printing device to print the preview-prohibited photograph. The print authorization menu may be selectable at the printing device. The print authorization menu may be selectable by a different person than the person sending the photograph. The print authorization may be selectable by a person that is the intended recipient of the photograph. A print authorization menu may be displayed for each preview-prohibited photograph to be printed at the printing device regardless of a previous authorization issued to a same user or computing device.

The displayable image and/or the selectable menu may be displayed prior to printing the preview-prohibited photograph. The preview-prohibited photograph may not be displayed prior to printing the preview-prohibited photograph. A person determining whether to authorize the printing device to print the preview-prohibited photograph may be restricted to the displayable image in making the determination and the person may be unaware of the appearance of the preview-prohibited photograph until they have the physical piece of printed print media with the preview-prohibited photograph printed thereupon.

Referring to FIG. 2, instructions 252, when executed by a processor (e.g., 242), may cause system 240 to print the non-displayable photograph. The non-displayable photograph may be printed responsive to receiving a selection to authorize the printing device to print the preview-prohibited photograph.

Figure 3:
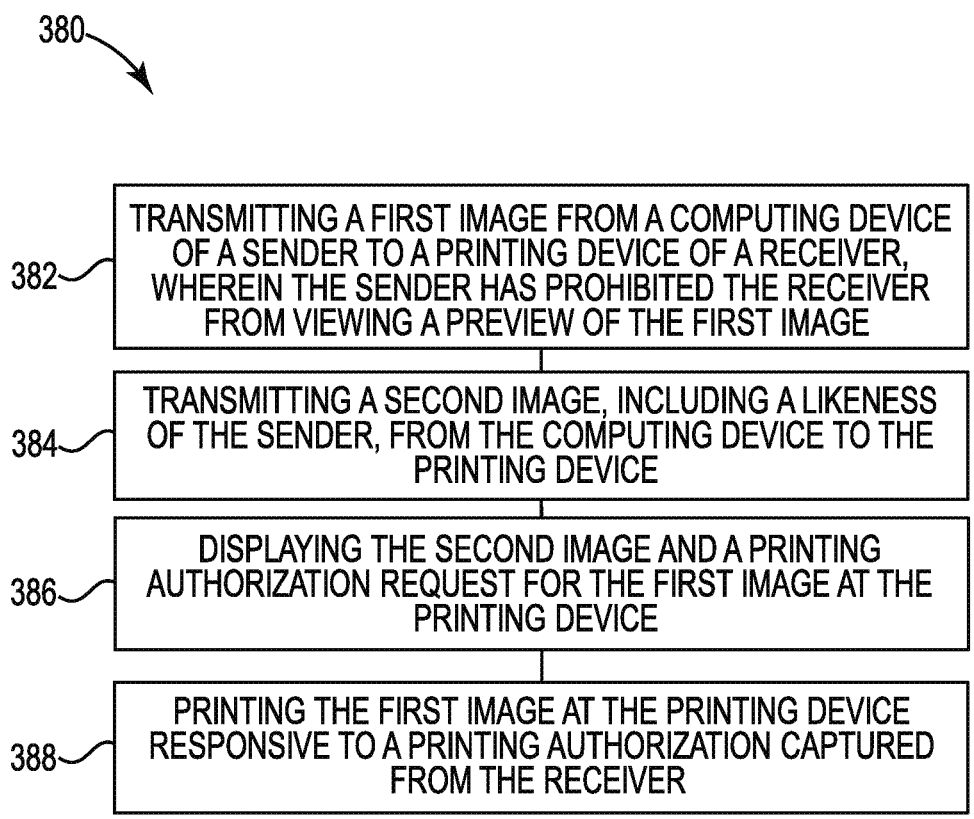
FIG. 3 illustrates an example of a method for prohibited preview printing according to the present disclosure.

FIG. 3 illustrates an example of a method 380 for prohibited preview printing according to the present disclosure. At 382, the method 380 may include transmitting a first image from a computing device of a sender to a printing device of a receiver. The sender may not utilize the printing device to print the first image without an authorization from the receiver that is received at the printing device. The sender may prohibit the receiver from viewing a preview of the first image. As such, a receiver may not be able to see a preview of the first image that they are authorizing to be printed by the printing device.

At 384, the method 380 may include transmitting a second image from the computing device to the printing device. The second image may be an image that accompanies the first image. However, unlike the first image that is prohibited from being previewed, the second image is displayable on a display of the printing device. The second image may be utilized by the receiver to identify a sender of the first image. For example, the second image may include a likeness of the sender, an emotional state of the sender, a sentiment of the sender, and/or a gesture intended by the sender.

Sending of the first image and the second image may be modulated by permissions granted by the receiver of the images. The receiver of the images may issue the permission through the printing device and/or through their own computing device. For example, the computing device of the sender may receive a permission from a computing device of the receiver for the transmitting the first image and the second image from the computing device of the sender to the printing device of the receiver. Alternatively, the receiver may deny permission to the computing device of the sender to send the first image and the second image to the printing device. Likewise, a sender and/or a senders computing device may be blocked from transmitting additional images to the printing device of the receiver responsive to receiving a block request from a computing device of the receiver.

The first and second images may be sent to a plurality of printing device associated with a plurality of receivers. For example, a selection of a plurality of receivers from a contact list to receive the first image and the second image may be received. The first image and second image may be transmitted to the plurality of printing devices corresponding to the selected plurality of receivers.

At 386, the method 380 may include displaying the second image. The second image may be displayed on a computing device of the receiver and/or on a display portion of the printing device. Additionally, a printing authorization for the first image may be displayed on the display portion of the printing device. The first image may not be displayed on the computing device of the user of on a display portion of the printing device.

At 388, the method 380 may include printing the first image at the printing device. The second image may not be printed. The second image may be for display purposes on the printing authorization and may not be part of the print generated by the printing device. The first image may be printed responsive to a printing authorization captured from the receiver. The printing authorization may be captured at the receiver's computing device and/or at the receiver's printing device.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a" element and/or feature can refer to one or more of such elements and/or features.

What is claimed:

1. A system comprising:
   a computing device comprising instructions executable to:
   send a first image to a printing device, wherein the printing device s prohibited to display a preview of the first image and wherein the computing device is not authorized to print the first image utilizing the printing device, send a second image to the printing device, wherein the second image includes a graphical identifier of a sender; and the printing device comprising instructions executable to:
  display the second image,
  receive an authorization to print the preview-prohibited first image; and
  print the first image.

2. The system of claim 1, wherein the graphical identifier includes a customizable cartoon avatar of the sender.

3. The system of claim 1, wherein the graphical identifier includes a geographic location of the sender.

4. The system of claim 1, wherein the graphical identifier expresses a mood of the sender.

5. The system of claim 1, the computing device comprising the instructions executable to limit an amount of images the computing device is permitted to send to the printing device that the printing device is prohibited to display.

6. The system of claim 1, the printing device comprising the instructions executable to limit an amount of images the printing device is permitted to receive that the printing device is prohibited to display.

7. The system of claim 1, the computing device comprising the instructions executable to determine the printing device based on a selection of a receiver from a list of social network service contacts.

8. A non-transitory computer readable medium containing instructions executable by a processor to cause the processor to:
  receive, at a printing device, a preview-prohibited photograph from a computing device;
  receive, at the printing device, a displayable image identifying a person associated with the preview-prohibited photograph;
  display, on the printing device, the displayable image and a print authorization menu selectable to authorize the printing device to print the preview-prohibited photograph; and
  print the preview-prohibited photograph responsive to receiving a selection to authorize the printing device to print the preview-prohibited photograph.

9. The non-transitory computer readable medium of claim 8, wherein the displayable image does not include content from the preview-prohibited photograph.

10. The non-transitory computer readable medium of claim 8, wherein the printing device receives the preview-prohibited photograph and the displayable image via a wireless connection.

11. The non-transitory computer readable medium of claim 8, wherein the preview-prohibited photograph is captured from a camera of the computing device.

12. A method, comprising:
  transmitting a first image from a computing device of a sender to a printing device of a receiver, wherein the sender has prohibited the receiver from viewing a preview of the first image;
  transmitting a second image, including a likeness of the sender, from the computing device to the printing device;
  displaying the second image and a printing authorization request for the first image at the printing device; and
  printing the first image at the printing device responsive to a printing authorization captured from the receiver.

13. The method of claim 12, comprising receiving a permission from a computing device of the receiver for the transmitting the first image and the second image from the computing device of the sender to the printing device of the receiver.

14. The method of claim 12, comprising blocking the sender from transmitting an additional image to the printing device of the receiver responsive to receiving a block request from a computing device of the receiver.

15. The method of claim 12, comprising receiving a selection of a plurality of receivers to receive the first image and the second image and transmitting the first image and second image to a plurality of printing devices corresponding to the selected plurality of receivers.

* * * * *